E. BIGNELL.
SELF SINKING CAISSON.
APPLICATION FILED AUG. 19, 1911.
1,024,823.
Patented Apr. 30, 1912.
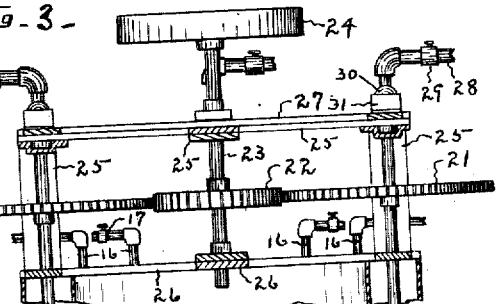
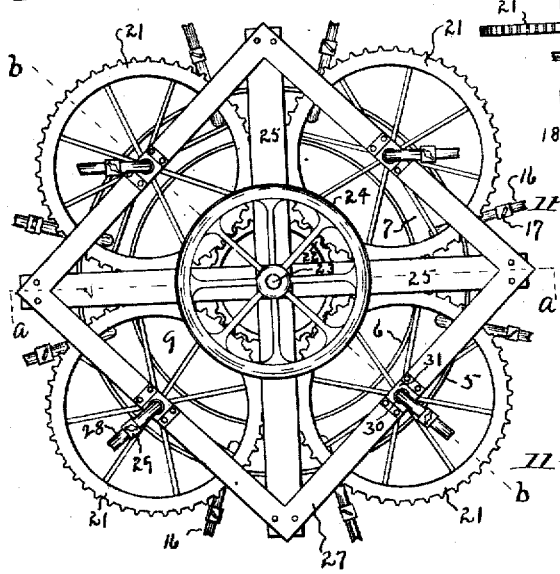
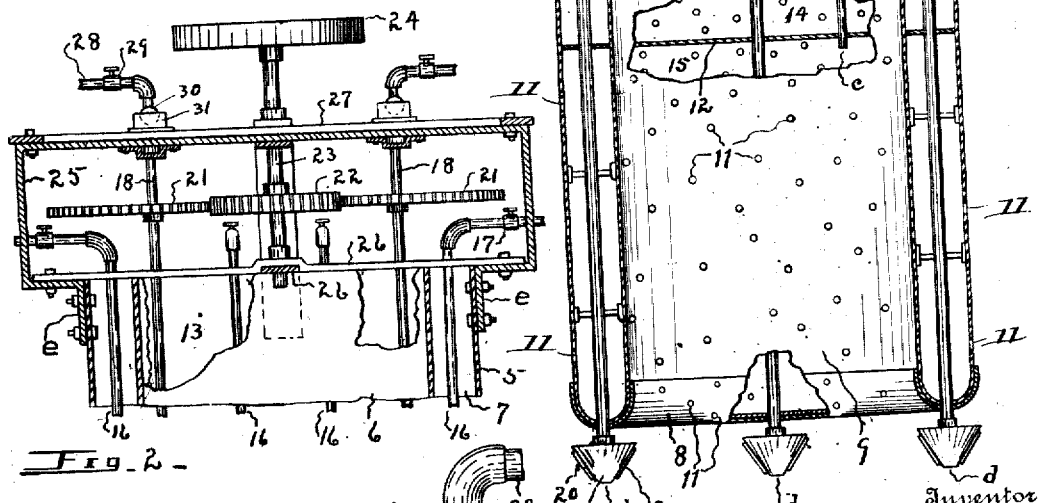
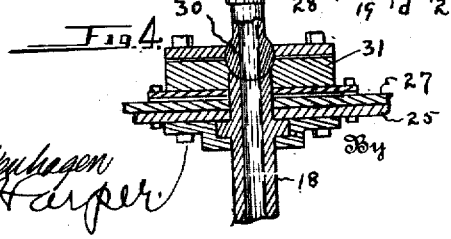
Witnesses
R. E. Borkenhagen
C. R. Harper
Inventor
Edward Bignell,
By Hiram A. Sturges,
Attorney

UNITED STATES PATENT OFFICE.

EDWARD BIGNELL, OF LINCOLN, NEBRASKA.

SELF-SINKING CAISSON.

1,024,823. Specification of Letters Patent. Patented Apr. 30, 1912.

Application filed August 19, 1911. Serial No. 644,965.

*To all whom it may concern:*

Be it known that I, EDWARD BIGNELL, a citizen of the United States, residing at Lincoln, in the county of Lancaster and State of Nebraska, have invented certain new and useful Improvements in Self-Sinking Caissons, of which the following is a specification.

This invention relates to an improvement in caissons, and has for its principal object to provide caissons which may be lowered or sunk in either hard or soft ground in an expeditious manner, comparatively, and without the presence of workmen operating below the surface of the ground, as usually required.

The caisson as described may be said to be "self-sinking", or one which will sink by reason of its own weight, devices being employed to remove the obstructing soil. It includes an elongated, cylindrical container having a hollow, perforated wall with compartments, and formed with a central aperture, devices being provided for causing water to pass outwardly through the perforations to remove adhesions, and drills being employed to loosen the soil below the hollow wall, the shafts of the drills being formed of tubular material, so that water under pressure may be passed to the drills.

The caisson is particularly useful in connection with building operations where hard soil may be encountered, the soil from beneath the double-walls of the caisson passing upward through the central aperture by force of the water which is discharged through the tubular shafts and through the perforations.

The invention consists of the novel construction, combination and arrangement of parts as described herein and claimed, and as illustrated in the drawing, it being understood that changes in form, size, proportion and minor details may be made within the scope of the claims without departing from the spirit of the invention or sacrificing any of its advantages.

In the accompanying drawing forming a part of the application, Figure 1 is a plan view of the caisson and mechanism for rotating the tubular drill-shafts. Fig. 2 is a vertical, side view showing the upper part of the caisson, being a section on line *a a* of Fig. 1. Fig. 3 is a vertical side view in section, taken on line *b b* of Fig. 1, parts being broken away. Fig. 4 is an enlarged detail in section, showing the water passageway at the junction of a stationary supply pipe and a rotatable tubular shaft.

Referring now to the drawing for a more particular description, the caisson consists, in part, of an upright container formed by a cylindrical casing 5, a second cylindrical casing 6 of lesser diameter being employed and disposed within casing 5 to form an annular chamber or recess 7, extending from the downwardly convergent bottom 8 to the upper ends of the casings, and thereby forming a comparatively large central aperture 9 opening upon the upper and lower ends of the container.

At 10 are indicated braces which may be disposed transversely between the two casings or walls mentioned for the purpose of sustaining these walls against lateral pressure; and at 11 are indicated perforations formed in both the outer and inner walls and bottom of the container.

At 12 are indicated partitions disposed transversely within and at longitudinal intervals of chamber 7, whereby annular compartments 13, 14 and 15 may be formed.

At 16 are indicated conducting-pipes; and water, under pressure from any suitable source of supply, may pass within the upper ends of these pipes and may be discharged within any one or all of the compartments, the discharge ports of these conducting-pipes being indicated at *e*. While I have shown three annular compartments a greater or lesser number may, of course be provided, this depending on the length and diameter of the caisson, and any desired number of conducting pipes 16 may be employed. In practice, the walls of the upper compartment of the caisson are not generally perforated, for the reason that the upper part of the caisson does not enter the soil. When the caisson is being lowered, the soil will move upwardly in the central opening 9 and also near the outer wall of the container, the passage of the water outwardly through the perforations aiding in this movement. Each conducting pipe is provided with a check valve 17 so that it may be under control of an operator and the pressure of water in any compartment may be regulated. When the caisson is being sunk in soft or hard soil a lesser or greater flow or pressure of water at the discharges *c* may be maintained as may be required.

It may be said that the caisson consists of an elongated, centrally apertured container having a hollow perforated wall. This wall may have any degree of attenuity consistent with the strength required for its use, and where the caisson is to be lowered in sand or moist ground, the construction already described would be practical without the use of drills. Where the caisson is to be lowered in hard soil, additional devices are employed, as the rotatable tubular shafts 18 disposed within the hollow wall and traversing partitions 12 and the bottom 8, to project somewhat below the caisson, and having discharge ports $d$, downwardly tapered heads or drills 19 with fins 20 being secured upon their lower terminals. Any suitable means may be employed for rotating the tubular shafts; and for this purpose they may be provided, near their upper ends with pinions 21, the cogs thereof meshing with a central pinion 22 mounted upon the vertical shaft 23, the upper end of this shaft having a power wheel 24 to be actuated by any suitable means. While the nest of gears thus mentioned is mounted upon the upper end of the caisson and would be obtrusive, it will be understood that these parts are to be removed after the caisson has been lowered into the ground, and the arrangement of parts is such that they may be readily detached from the caisson.

At 25 are indicated a pair of cross-plates or frame members substantially of inverted U-shape, their lower ends being formed as brackets $e$ which may be bolted, temporarily, to the outer wall of the caisson. When thus mounted they will be disposed at right angles and, at their junction, they may provide bearings for the upper end of vertical shaft 23. The lower end of this shaft may have bearings in and at the middle of cross strips 26, these strips being supported upon the upper end of the caisson and bolted to brackets $e$.

At 27, upon the upper side and near the ends of plates 25, is indicated a flat and substantially square frame member secured to plates 25, this member being for the purpose of adding solidity to the other connected parts of the frame, and to provide bearings for the tubular shafts.

In operation, when wheel 24 is actuated it will cause a rotation of pinion 22, and thereby pinions 21 and the tubular shafts will be rotated to operate the drill-heads.

At 28 are indicated stationary pipes having check valves 29. These pipes are for the purpose of conducting water, under pressure, to the tubular shafts; and, to the end that a continuous passageway for water may be provided, from each pipe 28 to a tubular shaft, the usual construction is employed, which generally consists (Fig. 4) of the apertured ball 30 provided for the lower end of said pipe and mounted in the ball-housing 31, the bore of the pipe registering with the aperture of the ball.

Having fully described my invention, what I claim and desire to secure by Letters Patent is,—

1. A caisson consisting of a longitudinally apertured, cylindrical container having an outer and inner perforated wall; and a water conducting member having a discharge port disposed between said perforated walls.

2. An improvement in caissons, consisting of a longitudinally apertured cylindrical casing having its outer and inner walls formed with perforations; a transverse partition disposed between said outer and inner walls to form annular chambers; and pipes for conducting water having discharge ports in said chambers.

3. A caisson comprising a first, upright, metallic, cylindrical, perforated casing; a second metallic cylindrical perforated casing disposed within said first casing to form an annular chamber therebetween and to provide a central passageway opening upon the upper and lower ends of the casings, said casings having their lower edges connected by a downwardly convergent perforated wall; conducting-pipes having discharge ports within said chamber; and a plurality of braces disposed transversely within said chamber and bearing upon the cylindrical casings.

4. A caisson comprising a first, upright, metallic, cylindrical casing; a second metallic, cylindrical, perforated casing disposed adjacent to and within said first casing, said casings having their lower edges connected by a downwardly convergent perforated wall; partitions disposed transversely between and at longitudinal intervals of and bearing upon said casings to form annular compartments; and conducting-pipes having discharge ports within said annular compartments.

5. A caisson, consisting of a pair of perforated, tubular members of different diameters, one being disposed within the other to form an annular chamber therebetween, annular partitions between said members to divide the chamber into compartments; conducting-pipes leading to and having discharge ports within said compartments, and means upon said conducting-pipes for the control of said discharge ports.

6. A caisson consisting of a pair of upright, tubular casings disposed one within the other and connected at their lower ends to form an annular containing chamber and to provide a central passageway opening upon the ends of said casings; conducting-pipes disposed between the tubular casings and having discharge ports below the lower end of said annular containing chamber.

7. A caisson consisting of a pair of upright, tubular casings disposed one within the other and connected at their lower ends; a tubular, rotatable shaft disposed between, with its lower terminal projecting below said casings, the lower terminal of said tubular shaft being provided with a drill-head.

8. A caisson consisting of a pair of upright, tubular casings disposed one within the other and connected at their lower ends; a plurality of rotatable tubular shafts, each having a discharge port and being provided with a terminal drill-head; said tubular shafts being supported by and disposed between the casings with their terminal drill-heads projecting outwardly of the lower ends of said casings, said discharge ports opening outwardly of the drill-heads.

9. A caisson comprising a pair of upright, cylindrical, perforated casings of different diameters, connected at their lower ends, one of said casings being disposed to circumscribe the other; partitions disposed transversely between the casings to form compartments; conducting-pipes having discharge ports in said compartments; a tubular rotatable shaft formed with a tapered head and having a discharge port; said shaft being disposed between the casings with its tapered head and discharge port disposed below the lower ends of said casings.

10. An improvement in caissons comprising a longitudinally and centrally apertured cylindrical container having a hollow perforated wall; partitions disposed transversely in said wall to form compartments; conducting-pipes having discharge terminals in the compartments; a plurality of rotatable tubular shafts provided with drill-heads and having discharge ports; said shafts being disposed in the hollow perforated wall of the container and traversing the partitions of said compartments to dispose said drill-heads and discharge ports outwardly of one of the terminals of said container.

11. An improvement in caissons comprising an elongated container formed with a hollow, cylindrical, perforated wall to provide an annular chamber and with a central longitudinal aperture opening on its ends; transverse partitions disposed in said annular chamber to form compartments; conducting-pipes having discharge ports within said compartments; devices upon the conducting-pipes for a control of the discharge ports thereof; a plurality of rotatable tubular shafts provided with drill heads and having discharge ports, said shafts being disposed in and traversing said compartments to dispose said drill heads and discharge ports outwardly of one of the ends of said container; and devices connected with said tubular shafts for a control of the discharge ports thereof.

12. A caisson comprising an upright, elongated, container having a hollow, cylindrical wall perforated on its outer and inner sides and formed with a cylindrical recess opening upon its top and bottom; a plurality of braces disposed transversely in said wall; partitions disposed in said wall to form annular compartments; conducting-pipes supported by the container and having discharge ports within the compartments; rotatable tubular shafts provided with drills; said shafts being supported by and disposed longitudinally of the container and traversing said compartments to dispose said drills below the hollow, cylindrical wall of said container.

13. An improvement in caissons, consisting of an elongated, upright cylindrical container formed with a hollow side wall and with a longitudinal aperture opening upon its ends; rotatable shafts provided with drills at one of their terminals and disposed longitudinally of and within the side wall to dispose said drills below the lower end of said container.

14. An improvement in caissons, comprising an elongated, upright, cylindrical container formed with a hollow perforated side wall and with a longitudinal aperture opening upon its ends; conducting-pipes having discharge ports within the hollow side wall; rotatable shafts provided with drill-heads at one of their terminals, said shafts being disposed longitudinally of and traversing the side wall of the container to dispose their drill-heads below and in the plane of said side wall.

15. A caisson, comprising, in combination with a container having an outer and inner perforated cylindrical side wall and a longitudinal aperture opening upon its top and bottom; braces disposed transversely between the walls; partitions disposed transversely and forming annular compartments between the side walls; conducting-pipes provided with controlling devices and having discharge ports disposed within said compartments; rotatable shafts each having a drill mounted upon one of its terminals, said shafts traversing said partitions and extending between to dispose said drills below said cylindrical perforated walls.

In testimony whereof I have affixed my signature in presence of two witnesses.

EDWARD BIGNELL.

Witnesses:
W. G. S. Cook,
Elmer F. Estes.